(12) United States Patent
Helm

(10) Patent No.: US 9,180,526 B2
(45) Date of Patent: Nov. 10, 2015

(54) MANUALLY OPERATED CHUCK

(75) Inventor: Peter Helm, Meckenbeuren (DE)

(73) Assignee: SMW-AUTOBLOK Spannsysteme GmbH, Meckenbeuren (DE)

( * ) Notice: Subject to any disclaimer, the term of this patent is extended or adjusted under 35 U.S.C. 154(b) by 424 days.

(21) Appl. No.: 13/507,927

(22) Filed: Aug. 7, 2012

(65) Prior Publication Data
US 2013/0056941 A1  Mar. 7, 2013

(30) Foreign Application Priority Data
Aug. 17, 2011  (EP) ..................................... 11177776

(51) Int. Cl.
B23B 31/16  (2006.01)

(52) U.S. Cl.
CPC ....... B23B 31/16045 (2013.01); *B23B 2270/12* (2013.01); *Y10T 279/1074* (2015.01); *Y10T 279/1973* (2015.01); *Y10T 279/22* (2015.01); *Y10T 279/26* (2015.01)

(58) Field of Classification Search
CPC ..................... B23B 31/16045; B23B 2270/12; Y10T 279/1074; Y10T 279/1973; Y10T 279/22; Y10T 279/26
USPC .................................. 279/110, 121, 127, 133
See application file for complete search history.

(56) References Cited

U.S. PATENT DOCUMENTS

| | | | | |
|---|---|---|---|---|
| 966,630 | A * | 8/1910 | Whiton ......................... | 279/110 |
| 1,594,716 | A * | 8/1926 | Forkardt ....................... | 279/114 |
| 2,948,540 | A * | 8/1960 | Garberding et al. ......... | 279/4.12 |
| 3,142,491 | A * | 7/1964 | Ohashi ......................... | 279/4.12 |
| 3,420,539 | A * | 1/1969 | Pahlitzsch et al. ............ | 279/112 |
| 3,424,467 | A * | 1/1969 | Buck ............................ | 279/2.13 |
| 3,606,364 | A * | 9/1971 | Benjamin et al. ............. | 279/121 |
| 3,635,481 | A * | 1/1972 | Hiestand ...................... | 279/115 |
| 3,656,773 | A | 4/1972 | Blattry et al. | |
| 3,765,691 | A * | 10/1973 | Saruhashi ....................... | 279/71 |
| 3,870,323 | A * | 3/1975 | Beckers ........................ | 279/112 |
| 4,094,522 | A * | 6/1978 | Hiestand ..................... | 279/4.02 |
| 4,130,290 | A * | 12/1978 | Rohm ........................... | 279/121 |
| 4,465,289 | A * | 8/1984 | Banks ........................... | 279/121 |
| 4,507,031 | A * | 3/1985 | Hiestand ...................... | 409/234 |
| 4,521,028 | A * | 6/1985 | Hiestand ...................... | 279/130 |

(Continued)

FOREIGN PATENT DOCUMENTS

DE  2004889  9/1971
DE  3304876 A1 *  8/1984

(Continued)

*Primary Examiner* — Eric A Gates
(74) *Attorney, Agent, or Firm* — Pandiscio & Pandiscio

(57) ABSTRACT

A manually operated chuck for machining of rotationally symmetrical workpieces, the chuck comprising: a base body, attached to clamping jaws radially movable on the base body for securing the workpiece and in which an opening extends at right angles to a longitudinal axis of the base body; a threaded spindle movably mounted in the opening and accessed from outside to change the position, thereof; a wedge bar in the base body proximate the spindle, the wedge bar being connected to the spindle and a clamping jaw in a shape-locking arrangement; a driving ring rotationally mounted in the base body and connected to the threaded spindle and to one of the wedge bars with play between the threaded spindle and driving ring, and/or the threaded spindle and a wedge bar, and/or between the driving ring and wedge bars of the clamping jaws, the workpiece disposed concentrically to a longitudinal axis of the chuck.

8 Claims, 5 Drawing Sheets

(56) References Cited

U.S. PATENT DOCUMENTS

| | | | |
|---|---|---|---|
| 4,527,808 A | | 7/1985 | Hiestand |
| 4,938,491 A | * | 7/1990 | Sumenko et al. ............ 279/133 |
| 5,102,152 A | * | 4/1992 | Grund et al. ................ 279/2.11 |
| 5,340,130 A | * | 8/1994 | Gorse .......................... 279/110 |
| 5,630,594 A | * | 5/1997 | Bronzino et al. ............ 279/123 |
| 5,716,058 A | * | 2/1998 | Bronzino et al. ............ 279/121 |
| 6,464,235 B2 | * | 10/2002 | Rohm .......................... 279/123 |
| 2011/0260416 A1 | * | 10/2011 | Helm ........................... 279/121 |
| 2015/0042051 A1 | * | 2/2015 | Maurer ........................ 279/121 |

FOREIGN PATENT DOCUMENTS

| | | | |
|---|---|---|---|
| DE | 102006027988 A1 | * | 12/2007 |
| EP | 0085782 | | 8/1983 |
| FR | 2093897 A5 | * | 1/1972 |
| GB | 1287968 A | * | 9/1972 |

* cited by examiner

MANUALLY OPERATED CHUCK

BACKGROUND OF THE INVENTION

1. Field of the Invention

The invention relates to a manually operated chuck for machine tools for machining of rotationally symmetrical workpieces involving cutting.

2. Description of the Prior Art

A chuck of the instant kind for lathes is disclosed in DE 2004 889, which relates to a base body in which three clamping jaws are disposed in a radially movable arrangement. The base body is releasably connected to a machine tool. The clamping jaws are moved to and fro in the base body by means of a driving ring, and are used for clamping rotationally symmetrical workpieces. The clamping jaws are arranged on the base body with a pitch angle of 120°.

Two of the three clamping jaws are directly driveably connected to the driving ring by means of a wedge bar, and are moved linearly in the base body between the particular wedge bar and the clamping jaw due to the helical gearing.

The driving ring is in a shape-locking or drivable connection with a threaded spindle inserted in the base body, wherein the threaded spindle is mounted in the base body at right angles to its longitudinal axis and can be moved in this arrangement. The threaded spindle can be operated manually from the outside, for example, by using a spanner as a tool, which accounts for the fact that a chuck of this kind is also referred to as a manually operated chuck, because the clamping force to be applied is generated manually using the tool.

One of the three clamping jaws is in a direct, drivable connection with the threaded spindle by means of a helically geared wedge bar, and is consequently moved by the movement of the threaded spindle, and synchronously with the two other clamping jaws.

It has proven to be, a disadvantage and a particular technical challenge in such manually operated chucks over the past decades that it is not possible optimally to centre the workpiece in relation to the longitudinal axis the base body. This is because there is a fault tolerance resulting from the manufacturing process between the individual components required for operating the clamping jaws, namely the threaded spindle, the driving ring, the corresponding wedge bars and their clamping jaws, as a result of which tolerance the clamping jaws cannot adequately achieve a central fixing of the workpiece. The presence of play leads to the permanent effect that the workpiece slips out of the set position during its rotation and machining, within a limit area of about 5 µm. It is only possible to achieve a lower fault tolerance than 5 µm at the cost of huge expenditure in production, as a result of which it is more cost-effective to manufacture chucks with a lower fault tolerance than chucks with a higher fault tolerance. However, the higher the fault tolerance, the greater the inaccuracies in metal-cutting machining on a workpiece.

The manually operated chucks of prior art do make it possible to compensate for the existing play between the individual components that drive the clamping jaws, e.g. the driving ring, the wedge bars and the threaded spindle, providing the workpieces involved are small. However, the larger the circumference of the driving ring, the larger the magnitude of the play between the driving ring and the individual components required for operating the clamping jaws. The bearing play can also be compensated in the case of light-weight workpieces, because workpieces of this kind do not exert any significant forces on the clamping jaws, with the effect that they may remain in their set position. Consequently, with heavy and large workpieces, it is not possible to compensate for the existing play between the components required for clamping the workpiece, with the effect that there is a permanent fault tolerance.

These bearing plays are inaccuracies which cannot be compensated for when clamping the workpiece, rather these inaccuracies are transferred to the clamping situation of the workpiece in such a way that a considerable inaccuracy arises between the position of the workpiece and the centre of the chuck, which leads to inaccuracies on the workpiece in the course of its machining. As a result, precise production and machining of the workpiece is not possible without further measures being taken.

It has proved to be a further disadvantage in the disclosed, manually operated chucks that clamping errors arise during the machining process which is often time consuming and highly complicated, because the machined workpiece becomes lighter during the machining process as a result of having material removed from it. Such working procedures involving material removal then result in the original position of the workpiece being changed in relation to the chuck and therefore in relation to the machine tool. A readjustment of the workpiece is often time-consuming and complicated to achieve.

The clamped workpieces are rotated by the machine tool in order to be machined. Therefore, in the case of a chuck with three clamping jaws offset at an angle of 120° in relation to one another, and in particular with exceedingly heavy and large workpieces of 20 tonnes inherent weight, for example, it has been observed that one clamping jaw which is located in a certain angular position of the chuck has to carry the weight of the workpiece exclusively, with the effect that it is not guaranteed that this clamping jaw can hold the workpiece reliably. Rather, the weight of the workpiece exceeds the clamping force of the individual clamping jaw, with the effect that it the jaw is forced outwards, the clamping force acting on the workpiece is eliminated. The workpiece is thus not reliably held in the chuck, and consequently its intended clamping position cannot be retained.

SUMMARY OF THE INVENTION

The purpose of the present invention is therefore to develop a manually operated chuck of the aforementioned kind, which has proven itself over many years, in such a way that firstly, the workpiece to be clamped is precisely centred in relation to the longitudinal axis of the chuck and, secondly, there is a centring adjustment possibility available permanently throughout the machining process. Furthermore, the chuck in accordance with the present invention permits a reliable and sustained support, even of extremely heavy workpieces with an inside or outside diameter of at least 0.5 meters.

At least one centring device is provided on a side which applies a centring force radially onto the workpiece, and therefore the workpiece can be centred exactly, once it has been clamped in the three clamping jaws, because the corresponding centring device ensures that the longitudinal axis of the workpiece is positioned flush in relation to the longitudinal axis of the chuck, without the centring force acting on the clamping jaws. This is because the clamping jaws are connected in a shape-locking arrangement with a driving ring and a threaded spindle, via a wedge bar. However, the driving ring, the wedge bar, and the threaded spindle are mounted in the base body of the chuck with a play that is a feature of the manufacturing process, and so this play can be compensated for by means of the corresponding centring device. As a result, the centring force of the corresponding centring device does not act on the clamping jaws and therefore on the components which drive the clamping jaws, but rather compensates for the existing bearing play and/or error tolerances, which are in the region of about 5 µm, in particular, with extremely large outside diameters. These are significant error tolerances for precision components and can therefore be compensated for by the centring devices in such a way that the workpieces in the chuck can be installed precisely centrally in the chuck.

The existing error tolerances of the chuck are therefore no longer transferred to the workpiece during the machining process, but are instead compensated.

During the machining process, half of the existing material and therefore half of the inherent weight are sometimes removed from the workpiece by cutting processes; therefore the inherent weight of the workpiece is reduced during the machining process, with the effect that the geometrical clamping conditions are also influenced. The centring devices can be moved independently from the clamping jaws, therefore such changes in the clamping conditions can be compensated for by the centring devices during the machining process, with the effect that the clamped workpiece can be positioned precisely centrally in relation to the chuck at all times without any variation in the clamping force exerted by the clamping jaws.

Furthermore, the centring device acts on the surface of the clamped workpiece, with the effect that the workpiece is supported not only by the clamping jaws, but also by the centring devices on the base body of the chuck.

It is particularly advantageous if three clamping jaws are arranged offset at an angle of 120° in relation to one another, and if one or two of the centring devices is/are arranged in between two adjacent clamping jaws. This construction results in the situation that six or nine clamping jaws and centring devices converging on one another at an angle of 60° or 40° act on the workpiece, with the effect that the workpiece is reliably supported on the chuck not only by the clamping jaws but also by the centring devices.

The centring devices can exhibit different design configurations. For example, but not exclusively, the centring devices can be configured as wedges, or as hydraulically operated clamping pins, or as threaded spindles. These centring devices have in common that a radially vectored centring force is applied to the surface of the workpiece and, by means of this centring force, it is possible to shift the workpiece and, with that, the longitudinal axis of the workpiece in relation to the longitudinal axis of the chuck.

Furthermore, the centring devices can be actuated synchronously or independently from one another, with the effect that precise alignment of the workpiece is achieved by the one or more of the centring devices, depending on the clamping situation achieved by the clamping jaws.

These setting possibilities mean that the position of the workpiece can be realigned with regard to the material reduction and, therefore, that the centring devices permit the realignment in position due to the change in position of the workpiece in relation to the midpoint of the chuck caused by the reduction in weight. As a result, the workpiece is positioned exactly centrally in relation to the chuck throughout the machining process; there is no need to remove and reclamp the workpiece because the workpiece is permanently held by the clamping jaws of the chuck throughout the machining processes. It is only the centring devices that need to be actuated in order to reposition the workpiece exactly centrally.

BRIEF DESCRIPTION OF THE DRAWINGS

The drawings show two embodiments of a chuck configured in accordance with the present invention, with three differently configured centring devices, the details of which are explained below. In the drawings.

DESCRIPTION OF THE PREFERRED EMBODIMENTS

Figure 1:
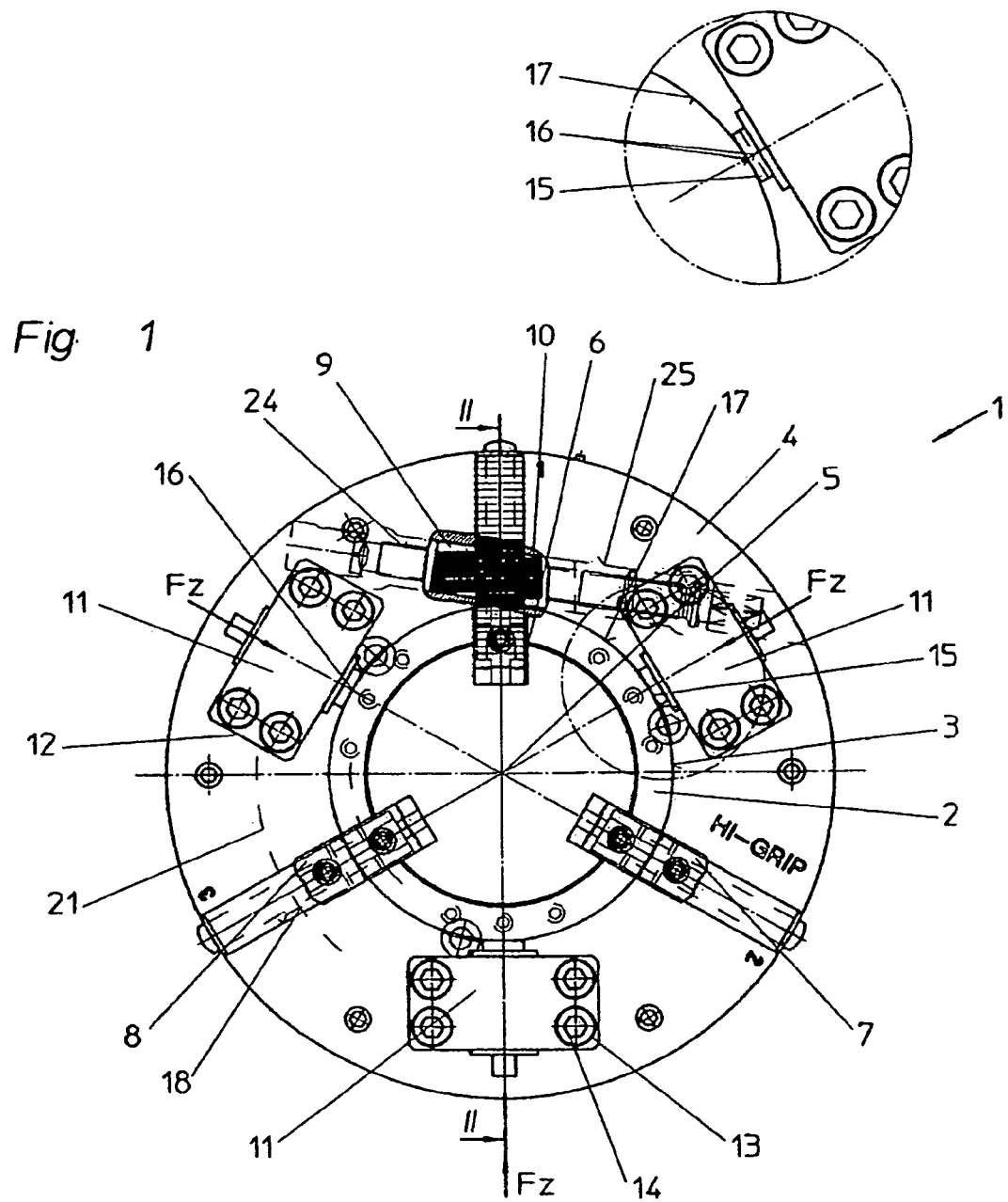
FIG. 1 shows a first sample embodiment of a chuck with three clamping jaws and three centring devices, shown schematically, arranged with a lateral offset in relation to the clamping jaws, in a plan view.
Figure 2:
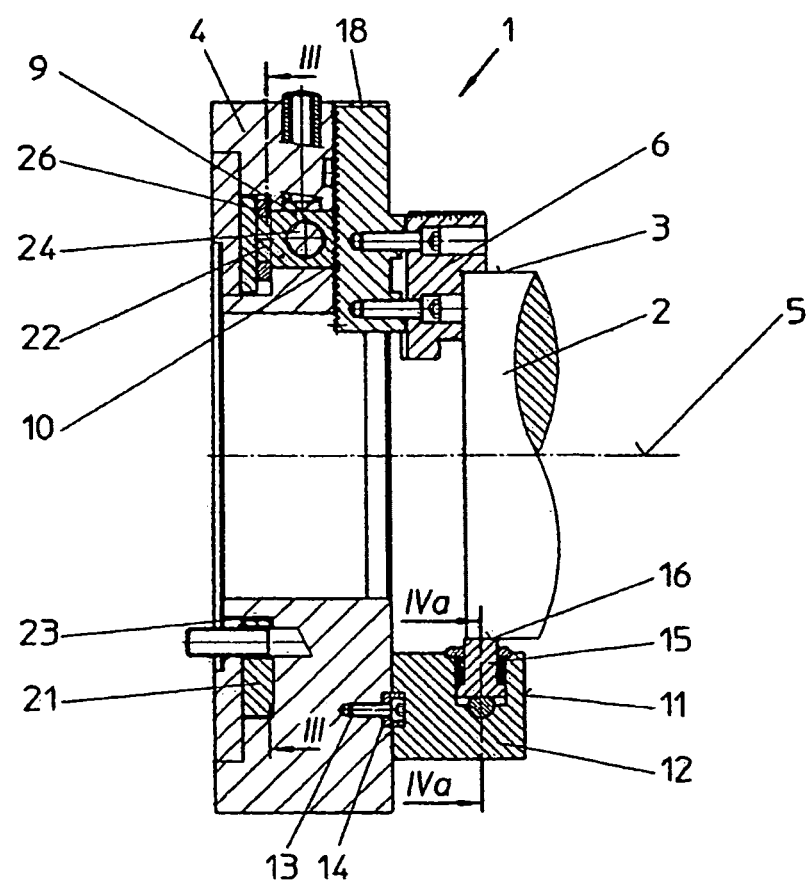
FIG. 2 shows the chuck in accordance with FIG. 1, along the section line II-II.
Figure 3:
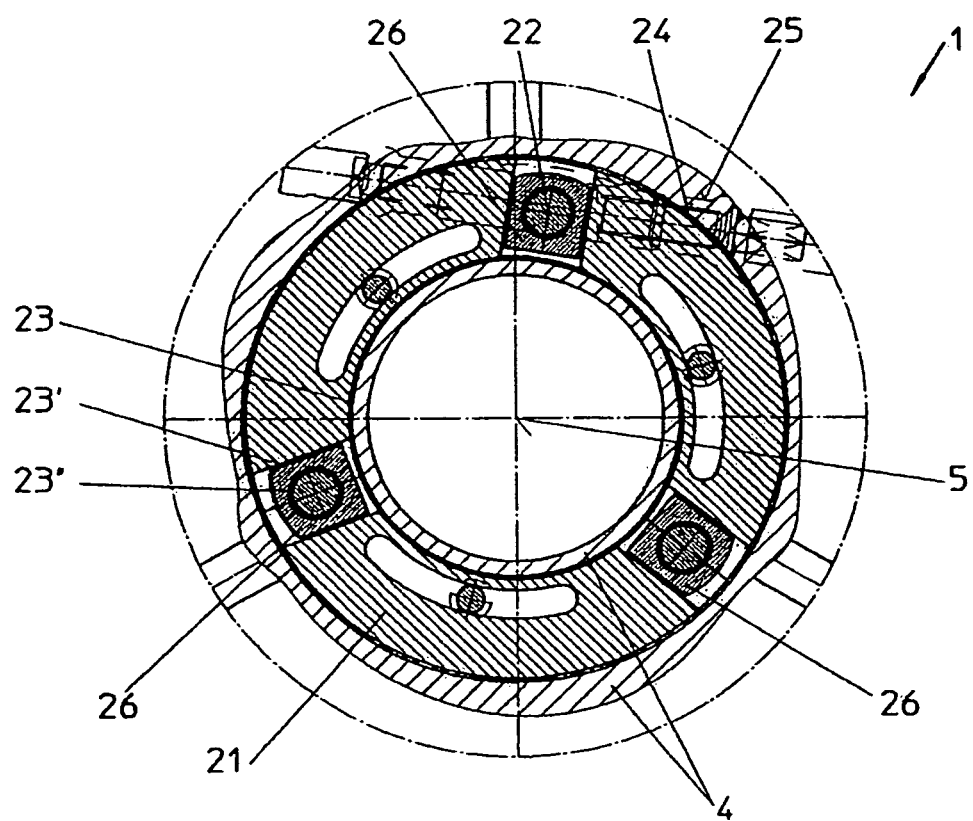
FIG. 3 shows the chuck in accordance with FIG. 2, along the section line III-III.

FIGS. 1, 2 and 3 show a chuck 1, by means of which a rotationally symmetrical, preferably round, workpiece 2 is held from the outside on a machine tool (not shown) for the purpose of machining the workpiece 2 by metal cutting. The chuck 1 consists of a base body 4, having a longitudinal axis 5. Three clamping jaws 6, 7 and 8 are mounted in a radially movable arrangement in guide grooves 18 aligned with the longitudinal axis 5. The clamping jaws 6, 7 and 8 are each driven by a wedge bar 9 arranged movably in the base body 4 in a usual manner. Helical gearing 10 is provided between each of the wedge bars 9 and the clamping jaws 6, 7 or 8, with the effect that a shape-locking active connection is provided between each of the clamping jaws 6, 7 or 8 and the corresponding wedge bar 9.

Two of the three wedge bars 9, as can be seen in particular in FIG. 3, can be driven by a driving ring 21. The driving ring 21 is normally mounted in the base body 4 so as to allow the driving ring 21 to rotate to a limited extent, and is connected in a drivable connection with a threaded spindle 24 held in a movable arrangement in an opening 25 in the base body 4. As soon as the driving ring 21 has a force exerted on it acting in a rotating direction around the longitudinal axis 5 of the base body 4, which involves the threaded spindle 24 moving to and fro in the opening 25, this results in the two wedge bars 9 shifting their position, because they are driveably connected to the driving ring 21 by a pin 22 mounted on the wedge bars 9 and by a sliding block 26.

The wedge bar 9 in a direct drivable active connection with the threaded spindle 24 moves the clamping jaws 6, 7, 8 when the wedge bar 9 is actuated. By means of the helical gearing 10, the clamping jaws 6, 7 and 8 are nevertheless advanced radially in guide grooves 18 towards the workpiece 2, or moved away from the workpiece 2. These movements take place synchronously.

The driving ring 21 is in a drivable connection with the wedge bars 9 of the two clamping jaws 7 and 8 by means of the pins 22 in a shape-locking arrangement. The pins 22, in turn, are driveably connected to the corresponding wedge bar 9 by means of the sliding blocks 26, i.e. in a shape-locking arrangement, with the effect that the rotation of the driving ring 21 triggered by the axial movement of the threaded spindle 24 causes the wedge bars 9 to be moved into the base body 4. As a result of the helical gearing 10 between the wedge bar 9 and the clamping jaws 7 and 8, the jaws 7 and 8 are advanced synchronously with the clamping jaw 6 toward the workpiece 2, with this advance movement continuing until active contact takes place between the three clamping jaws 6, 7 and 8 and the workpiece 2, by means of which adequate clamping force is exerted on the workpiece 2 in order to hold the workpiece 2.

The clamping jaws 6, 7 and 8 thus hold the workpiece 2 in a rotationally fixed arrangement on the chuck 1.

The rotationally symmetrical workpiece 2 has a longitudinal axis that should be arranged as concentrically as possible in relation to the longitudinal axis 5 throughout the entire machining process of the workpiece 2. Due to play 23, 23', 23'', shown schematically in FIG. 3, between the base body 4, the threaded spindle 24, and the driving ring 21, the wedge bars 9, and the clamping jaws 6, 7 and 8, however, it is often not possible to achieve this desired concentric, or coaxial, clamping of the workpiece 2 on the chuck 1. In particular, in the case of extremely large and heavy workpieces 2 which have an outside diameter of more than 0.5 meters and an inherent weight of more than five tons, it is not possible to compensate for the error tolerances that are due to the manufacturing conditions, with the effect that the fault tolerances 23, 23', 23'' between the wedge bars 9 and the driving ring 21 have to be compensated for. When the clamping jaws 6, 7 and 8 are advanced, this existing play 23, 23', 23'' results in the situation that the longitudinal axis of the workpiece 2 cannot be arranged flush or coaxially with the longitudinal axis 5 of the base body 4.

If, however, the workpiece 2 is machined, this error in the clamping of the workpiece 2 results in machining errors on the workpiece 2. In particular, in the case of precision parts, for example, rotors or shafts in electric motors or other high-quality machines, systems, or the like, error tolerances of this kind cannot be tolerated. The known error tolerances lead to a deviation of, for example, at least 5 µm. This deviation of 5 µm is correspondingly transferred to the clamping situation of the workpiece 2 on the chuck 1, with the effect that these error tolerances occur in equal measure during the machining of the workpiece 2, due to a prevailing installation situation.

Furthermore, material is removed from the workpiece 2 during the machining process involving metal cutting, with the effect that the inherent weight of the workpiece 2 is continuously reduced during the machining process. This machining, which reduces material, therefore results in the geometrical clamping situations being altered.

In order to set both the exact position of the workpiece 2, namely centrally, flush or coaxially in relation to the longitudinal axis 5 of the chuck 1, three centring devices 11 are provided by means of which a radially acting centring force $F_z$ acts on the workpiece 2, in order to compensate for the existing play 23, 23', 23''. The centring force $F_z$ should therefore not act on the clamping jaws 6, 7 or 8, but should exclusively compensate for the existing longitudinal deviations and align the workpiece 2 in such a way in relation to the longitudinal axis 5 that the longitudinal axis of the workpiece 2 runs flush or coaxially in relation to the longitudinal axis 5 of the chuck 1. It is possible to establish, for example, by electrical sensors or other contact sensors, that the centring devices 11 are securing the workpiece 2 in the required clamping situation and that the corresponding centring device 11 is secured.

The centring device 11 comprises a housing 12 which can be attached in a releasable manner on the base body 4 of the chuck 1. For this purpose, a plurality of holes 13 are provided in the base body 4 and through-holes are provided in the housing 12 with screws 14 passing through them, in order to screw the housing 12 onto the base body 4. Furthermore, a centring pin 15 is inserted in the housing 12, in which case the centring pin 15 projects from the housing 12 and has a centring surface 16.

The housings 12 of the three centring devices 11 must be arranged on the base body 4 in such a way that the centring surfaces 16 of the corresponding centring pins 15 extend along a shared arc 17 which is somewhat larger than the outside radius of the workpiece 2 to be machined. The clamping jaws 6, 7 and 8 are initially provided in order to accommodate the workpiece 2 and to secure it on the chuck 1. As soon as the clamping of the workpiece 2 by the clamping jaws 6, 7 and 8 has been accomplished in the familiar way, then the centring pins 15 of the corresponding centring device 11 must be set radially in relation to the workpiece 2.

Figure 4C:
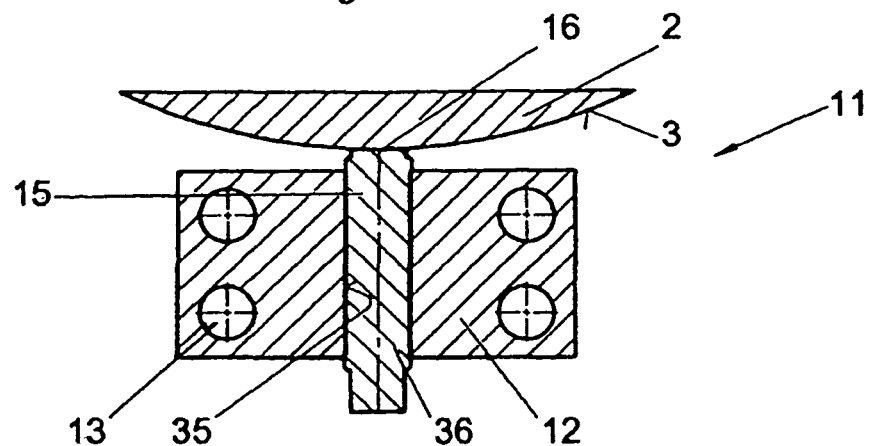
FIG. 4c shows a third sample embodiment of a centring device according to FIG. 1, in a section view.
Figure 4B:
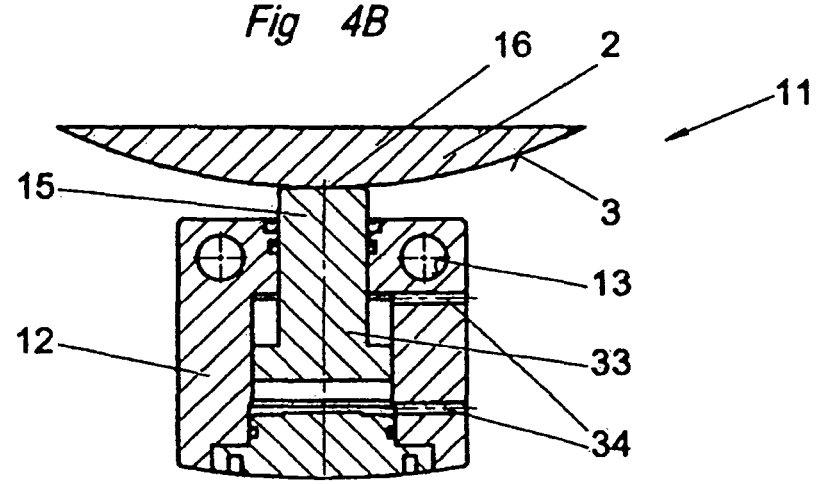
FIG. 4b shows a second sample embodiment of a centring device according to FIG. 1, in a section view.
Figure 4A:
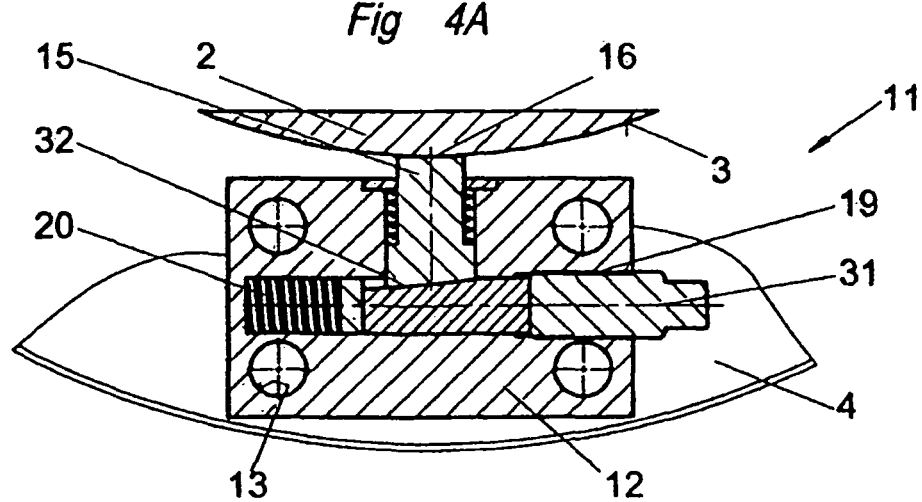
FIG. 4a shows a first sample embodiment of a centring device according to FIG. 1, in a section view.

FIGS. 4a, 4b and 4c show three differently designed embodiments of the corresponding centring device 11.

FIG. 4a shows a wedge 31 disposed in the housing 12 of the centring device 11, the wedge 31 having a tapering clamping surface 32. The centring pin 15 lies on the clamping surface 32 of the clamping pin 31, with the effect that when the pin 31 is pushed in, the radially acting centring force $F_z$, already referred to, is created and causes the centring pin 15 to advance in the direction of the workpiece 2, so that the workpiece 2 has the centring force applied to it. The pin 31 is pressed against the force of a spring 20 by means of the pin 31 being screwed into the housing 12. The pin 31 is held in a clamping thread 19 in the housing 12, with the effect that when the pin 31 is unscrewed, a return force is applied to the wedge 31 by the spring 20, by means of which the pin 31 is pushed out of the housing 12. A spring is also provided between the housing 12 and the centring pin 15, by means of which the centring pin 15 is moved back to its starting position when the wedge 31 is released.

FIG. 4b shows that the centring device 11 is formed from a hydraulic piston 33 on which the centring pin 15 is formed. The two spaces that are separated by the hydraulic piston 33 are filled with hydraulic fluid by means of two hydraulic connections 34, or else the spaces are alternately drained, with the effect that the hydraulic piston 33 has the radially acting centring force $F_z$ applied to it via the hydraulic connections 34, by means of which the centring pin 15 is advanced towards the workpiece 2 or moved away from it.

FIG. 4c shows that the design embodiment of the centring device 11 is undertaken in such a manner that a threaded spindle 36 is screwed into a female thread 35 in the housing 12, and the centring pin 15 is formed on the threaded spindle 36. Accordingly, when the threaded spindle 36 is screwed in, the centring pin 15 is advanced towards the workpiece 2.

The three design embodiments of the centring device 11 as shown in FIGS. 4a, 4b, 4c share the common feature that the centring surface 16 provided on the centring pin 15 is advanced out of its starting position corresponding to the arc 17 (FIG. 1) towards the workpiece 2, and the centring surface 16 exerts a centring force $F_z$ on the workpiece 2 that acts radially from the outside and the inside. During the advance movement of the corresponding centring pin 15, the workpiece 2 is held by the three clamping jaws 6, 7, and 8 on the chuck 1, and consequently on the machine tool that is not shown. The play 23 between the base body 4 and the actuating element 21 (driving ring) can therefore be compensated for by the movements of the corresponding centring pin 15. The centring pins 15 of the corresponding centring device 11 can be adjusted and driven independently of one another or synchronously with one another.

In the sample embodiment shown, the three clamping jaws 6, 7 and 8 are arranged in an angular position of 120° in relation to one another on the base body 4. One each of the centring devices 11 is provided between two adjacent clamping jaws 6, 7 or 8 in a centred position, with the effect that these also adopt a 120° angular position in relation to one other and the three clamping jaws 6, 7 and 8 are arranged at an angle of 60° in relation to the three centring devices 11.

The metal-cutting machining on the workpiece 2 means that its inherent weight is reduced, with the effect that the geometrical clamping situations change. The three clamping jaws 6, 7 and 8 in this case support the workpiece 2 on the chuck 1. The advance movement of the three centring devices 11 means that permanent repositioning of the workpiece 2 is possible in relation to the longitudinal axis 5 of the chuck 1. Therefore, the weight changes of the workpiece 2 can be compensated for by the centring devices 11 without the position of the three clamping jaws 6, 7 and 8 having to be changed.

Figure 5:
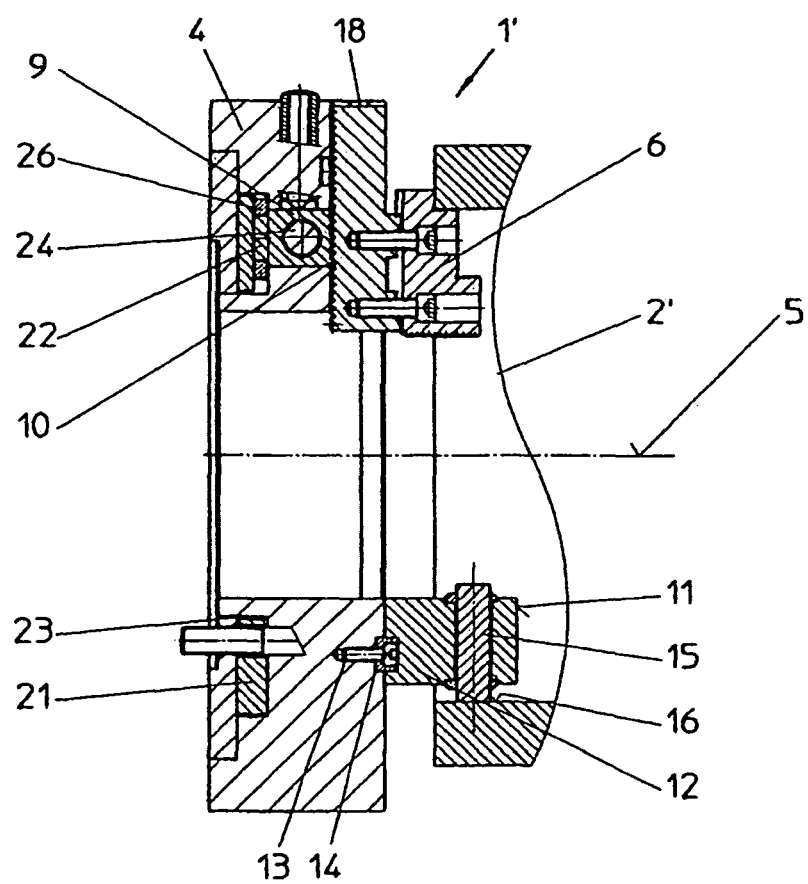
FIG. 5 shows a second sample embodiment of a chuck with three clamping jaws and three centring devices, shown schematically, arranged with a lateral offset in relation to the clamping jaws, in a section view.

FIG. 5 shows a chuck 1' by means of which a rotationally symmetrical workpiece 2' is clamped. The workpiece 2' in this case is configured as a rotationally symmetrical hollow body. The three clamping jaws 6, 7 and 8 are arranged inside the workpiece 2' during the clamping position, and exert a clamping force on the workpiece 2' that is directed radially outwards.

The three centring devices 11 are attached to the chuck 1' in the inside of the workpiece 2', with the effect that they exert a centring force $F_z$ onto the workpiece 2' that is directed radially outwards.

The centring surfaces 16 of the three centring pins 15 are on the shared arc 17, the radius of which is smaller than the inside radius of the workpiece 2'.

The corresponding centring device 11 can be actuated from the outside, for example by means of a tool that can be passed through the workpiece 2', in order to set the position of the corresponding centring device 11 manually. It is also conceivable for the corresponding centring device 11 to be provided with the design embodiments explained in FIGS. 4*a*, 4*b* and 4*c*. The corresponding centring device 11 can, for example, be actuated using the hydraulic drive unit shown in FIG. 4*b* without the need to reach through the workpiece 2'.

The invention claimed is:

1. A manually operated chuck for machine tools for machining of rotationally symmetrical workpieces involving cutting, the chuck comprising:
    a base body adapted to be attached to the machine tool, clamping jaws each held in a radially movable arrangement on said base body (4) for securing the workpiece and in which an opening is disposed running at right angles to a longitudinal axis of said base body,
    a threaded spindle mounted in the opening in a movable arrangement, wherein the threaded spindle can be accessed from the outside in order to change the position thereof,
    a wedge bar disposed in the base body in an area of said threaded spindle, the wedge bar being connected to said threaded spindle and one of said clamping jaws in a shape-locking arrangement,
    a driving ring mounted in said base body in a rotating arrangement, such that the driving ring is connected in a shape-locking arrangement to said threaded spindle and to a further wedge bar allocated to two further clamping jaws, and
    with play between the threaded spindle and the driving ring and/or the threaded spindle and one of the wedge bars and/or between the driving ring and the corresponding wedge bars (9) of said clamping jaws,
    wherein
    at least one centring device is supported on said base body (4) and movable radially and provided laterally offset to one or more of said clamping jaws (6, 7 or 8),
    wherein each centring device exerts a radially vectored force acting directly on the workpiece to be clamped, which is adjustable, by means of which the play is compensated,
    and the centring devices are adapted to be actuated jointly synchronously or independently from one another and/or independently from said clamping jaws.

2. The chuck in accordance with claim 1, wherein each of said centring devices (11) exhibits a centring surface directed towards said workpiece, said centring surfaces of said centring devices are arranged in a common arc which exhibits a larger radius than an outside radius of said workpiece, and the centring surface is adapted to be moved relative to said centring device by a centring pin.

3. The chuck in accordance with claim 2, wherein said centring device comprises a housing attached to said base body in a releasable connection and said housing is adapted to be attached to said base body in different angular positions and/or in different spacing positions in relation to the longitudinal axis of said base body.

4. The chuck in accordance with claim 3, wherein the centring pin is configured as a threaded spindle radially arranged in a female thread on the housing of the centring device (11) and is moveable relative to said housing.

5. The chuck in accordance with claim 2, wherein the centring pin acts in conjunction with a wedge and the wedge is provided with a clamping surface by means of which a radially vectored centring force results when the wedge is pushed in, and the centring force acts on the centring pin.

6. The chuck in accordance with claim 2, wherein the centring pin is adapted to be actuated by a hydraulically or pneumatically driven piston.

7. The chuck in accordance with claim 1, wherein said workpiece is configured as a hollow body, the clamping jaws make contact with said workpiece (2') from outside or inside said workpiece, said centring device exerts a radial force on the inside of the workpiece and said centring devices are adapted to be accessed through said workpiece in order for said centring devices to be actuated, and said centring devices are moveable electrically, hydraulically, or pneumatically, from outside thereof.

8. The chuck in accordance with claim 7, wherein said centring devices exhibit centring surfaces arranged on a common arc, which arc has a smaller radius than the inside radius of said workpiece.

* * * * *